US008991455B2

(12) United States Patent
Cron

(10) Patent No.: US 8,991,455 B2
(45) Date of Patent: Mar. 31, 2015

(54) MOLDED ARTICLE AND VENTING ASSEMBLY FOR A ROTATING MOLD

(75) Inventor: Steven M Cron, Simpsonville, SC (US)

(73) Assignees: Compagnie Generale des Etablissements Michelin, Clermont-Ferrand (FR); Michelin Recherche et Technique S.A., Granges-Paccot (CH)

(*) Notice: Subject to any disclaimer, the term of this patent is extended or adjusted under 35 U.S.C. 154(b) by 455 days.

(21) Appl. No.: 13/220,959

(22) Filed: Aug. 30, 2011

(65) Prior Publication Data

US 2013/0048174 A1 Feb. 28, 2013

(51) Int. Cl.
*B60C 7/10* (2006.01)

(52) U.S. Cl.
CPC ............. *B60C 7/10* (2013.01); *B60C 2007/146* (2013.01)
USPC ............ 152/324

(58) Field of Classification Search
USPC ............... 152/1, 5, 7, 11, 12, 69, 75, 90, 246, 152/270, 323, 324, 326
See application file for complete search history.

(56) References Cited

U.S. PATENT DOCUMENTS

| | | | | |
|---|---|---|---|---|
| 3,559,712 | A * | 2/1971 | Verdier | 152/209.14 |
| 3,584,670 | A * | 6/1971 | Verdier | 152/209.19 |
| 7,104,302 | B2 * | 9/2006 | Christenbury et al. | 152/516 |
| 7,202,194 | B2 | 4/2007 | Muhammed et al. | |
| 7,360,570 | B2 * | 4/2008 | Ishida | 152/516 |
| 7,418,988 | B2 | 9/2008 | Cron et al. | |
| 7,650,919 | B2 | 1/2010 | Rhyne et al. | |
| 8,113,253 | B2 * | 2/2012 | Arakawa et al. | 152/246 |
| 8,517,068 | B2 * | 8/2013 | Delfino et al. | 152/5 |
| 2009/0294000 | A1 | 12/2009 | Cron | |
| 2011/0017377 | A1 * | 1/2011 | Albert et al. | 152/520 |

FOREIGN PATENT DOCUMENTS

| | | | |
|---|---|---|---|
| WO | WO 2007080180 | * | 7/2007 |
| WO | WO 2007080180 A1 | * | 7/2007 |

* cited by examiner

*Primary Examiner* — S. Joseph Morano
*Assistant Examiner* — Jean Charleston
(74) *Attorney, Agent, or Firm* — John Steckler Schwab

(57) ABSTRACT

A molded article comprises an outer interface element, an inner interface element, and a plurality of web spokes positioned therebetween. The common surfaces of the inner and outer interface elements and a pair of adjacent web spokes form a void space. The surface of at least a portion of an interface element common to one of the voids has an edge radius with a variation from a maximum radius at a circumferential location corresponding to a mid point between a pair of adjacent web spokes to a minimum radius at a circumferential location corresponding to the intersection of the interface element with the web spoke.

11 Claims, 5 Drawing Sheets

MOLDED ARTICLE AND VENTING ASSEMBLY FOR A ROTATING MOLD

BACKGROUND

Non-pneumatic deformable structures for use in the support of loads under rolling conditions, such as to support loads for automotive vehicles have been described, for example in U.S. Pat. No. 7,201,194, which is commonly owned by the assignee of the current invention and is incorporated by reference in its entirety. The structurally supported, non-pneumatic tire disclosed therein includes an annular band that supports the load, a plurality of web spokes that transmit in tension the load forces between the annular band and a wheel or hub. A particularly useful design for the web spokes that improves spoke durability and allows the designer to vary the initial stiffness of vertical load versus vertical deflection is disclosed in United States Patent Publication No. 2009/0294000A1, which is also commonly owned by the assignee of the current invention and is incorporated by reference in its entirety. The non-pneumatic article supports its load solely through the structural properties and, contrary to the mechanism in pneumatic tires, without support from internal air pressure. In further embodiments, the annular shear band may comprise one or more sets of reinforcements that are radially spaced apart by an elastomeric material to form a shear layer between sets of reinforcements. In a particular embodiment, the shear band comprises a first membrane adhered to the radially inward extent of the shear layer and at least a second membrane adhered to the radially outer extent of the shear layer.

The non-pneumatic deformable structure may be manufactured by several alternative means. In one exemplary method the shear layer and web spokes may be made of the same material, for example polyurethane, and can be manufactured by a molding process to produce the non-pneumatic article. An alternative means comprises manufacturing the annular shear band as a separate article, and then forming the complete article by molding the spokes in a mold that uses the annular band as the radially outer surface and the hub as the radially inner surface. This method allows the designer to specify different materials for the annular band and for the web spokes. For the exemplary article disclosed in U.S. Pat. No. 7,201,194, the annular band comprises a rubber shear layer and includes an outer tread portion that is constructed and then vulcanized as a unit by conventional means known in the tire industry. The annular band and the hub are placed in a mold, where the mold cores and profiles define the geometry of the spokes for the finished article.

A common molding technique used for articles having axisymmetric elements (the annular band and the hub) and essentially radial elements (the web spokes) is to use a centrifugal casting method where the mold rotates at a given rotation speed and the material to be molded is poured into the mold near the axis of rotation of the mold. In an exemplary method, a two-pail polyurethane elastomer is premixed, and then poured into the mold, allowed to cure, and then the finished article may be removed from the mold. The centripetal force created by the rotation of the mold produces a radial pressure gradient component in the liquid elastomer that facilitates complete filling of the mold to avoid molding deficiencies in the finished article. For an example where the mold rotates about a vertical axis of rotation, the centripetal pressure gradient component combines with a gravitational pressure gradient component.

In such a process it is not unexpected for air to be entrapped either in the premixed polyurethane or in small cavities within the mold. In either case, the entrapped air can form small bubbles which negatively affect the aesthetic appearance or, possibly, the fatigue durability of the finished article. The small air bubbles have a density which is on the order of one thousand times less than the density of the polyurethane. Under the actions of the centripetal and gravitational pressure gradients, the bubbles are subject to a buoyancy force that tends to cause the bubbles to migrate to the axially upper edge of the interface between the spoke element and the annular band. The finished article will then contain small voids at this location which may negatively affect the fatigue durability of the finished article.

Accordingly, there is a need to solve the problem of voids in the finished non-pneumatic article and to improve the performance of the article. A new design of the molded article and the corresponding mold is thereby disclosed that urges the entrapped air bubbles to migrate towards a location where they can be vented, thereby eliminating the voids in the finished article.

SUMMARY OF THE EXEMPLARY EMBODIMENTS

A molded article comprises an outer interface element having a circumference and an axial width, an inner interface element having a circumference and an axial width, and a plurality of web spokes positioned therebetween. The web spokes are oriented in a generally radial direction. The common surfaces of the inner interface element, the outer interface element, and a pair of adjacent web spokes forms a void space bounded by, the common surfaces. At least a portion of the interface element common to one of the void spaces has an edge radius having a variation from a maximum radius at a circumferential location corresponding to a mid point between a pair of adjacent web spokes to a minimum radius at the intersection of the interface element with the web spoke.

In an exemplary embodiment of the molded article, the variation off the edge radius is defined by a set of decreasing radii at circumferential locations between the midpoint between a pair of adjacent web spokes and at least one of the adjacent web spokes. In a yet another embodiment the variation of said edge radius is defined by a plurality control radii. The plurality of control radii may comprise a first control radius at a circumferential location corresponding to a mid point between a pair of adjacent web spokes, a second control radius at a circumferential location circumferentially adjacent to a surface of the web spoke, and a third control radius at a circumferential location at the intersection of the interface element with the web spoke.

In a more specific embodiment the maximum value of the control radius is between about eighty percent and ninety five percent of the radial thickness of the interface element, and the second control radius is between about fifteen percent and thirty percent of the radial thickness of the interface element. The third control radius is very small or nearly zero and less than about five percent of the radial thickness of said interface element.

In another embodiment adapted to a mold having upper and lower parts, the edge radius of the portion of the interface element corresponding to a first void space is variable, and the edge radius of the portion of the interface element corresponding to a second void space is constant. Furthermore, the first and second void spaces may be circumferentially adjacent.

DETAILED DESCRIPTION

Figure 1:
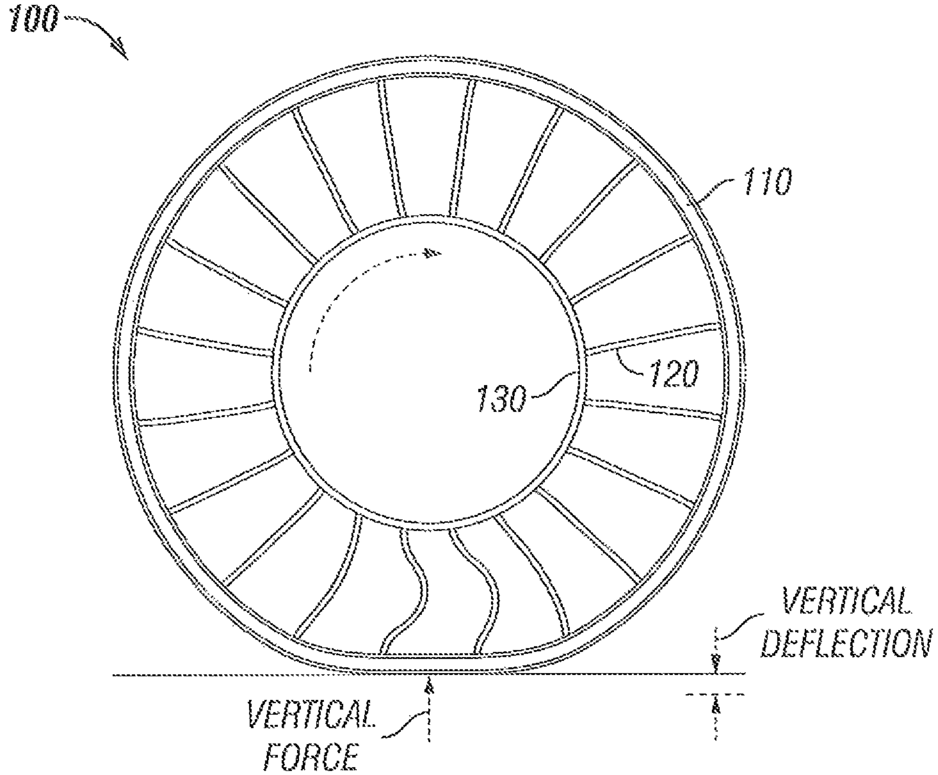
FIG. 1 depicts a non-pneumatic deformable structure 100 in rolling contact with a flat surface having radially oriented spokes.
Figure 2:
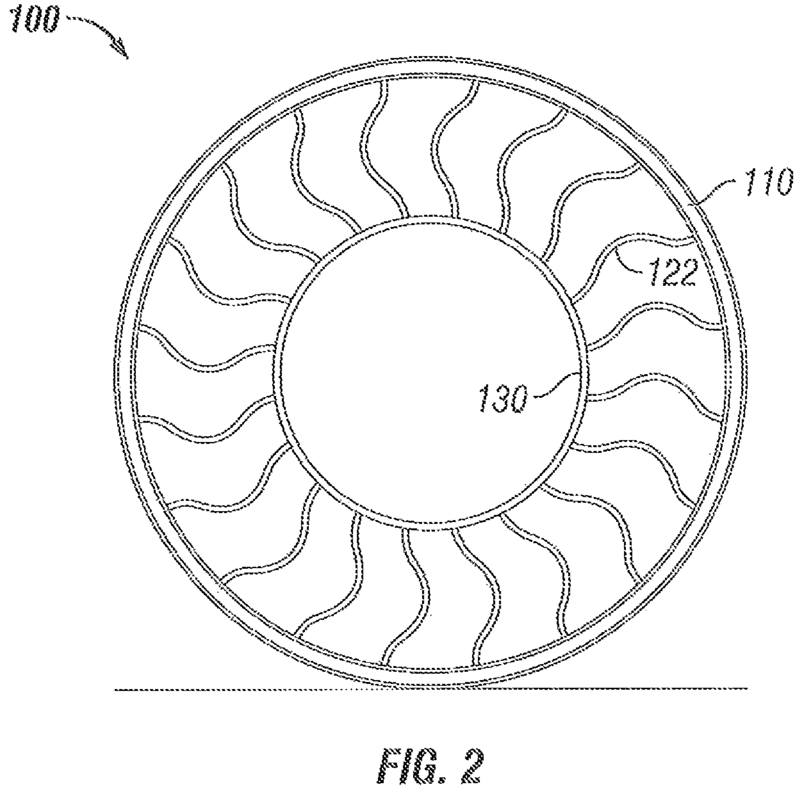
FIG. 2 depicts a non-pneumatic deformable structure 100 in rolling contact with a flat surface and having an optimized spoke shape.
Figure 3:
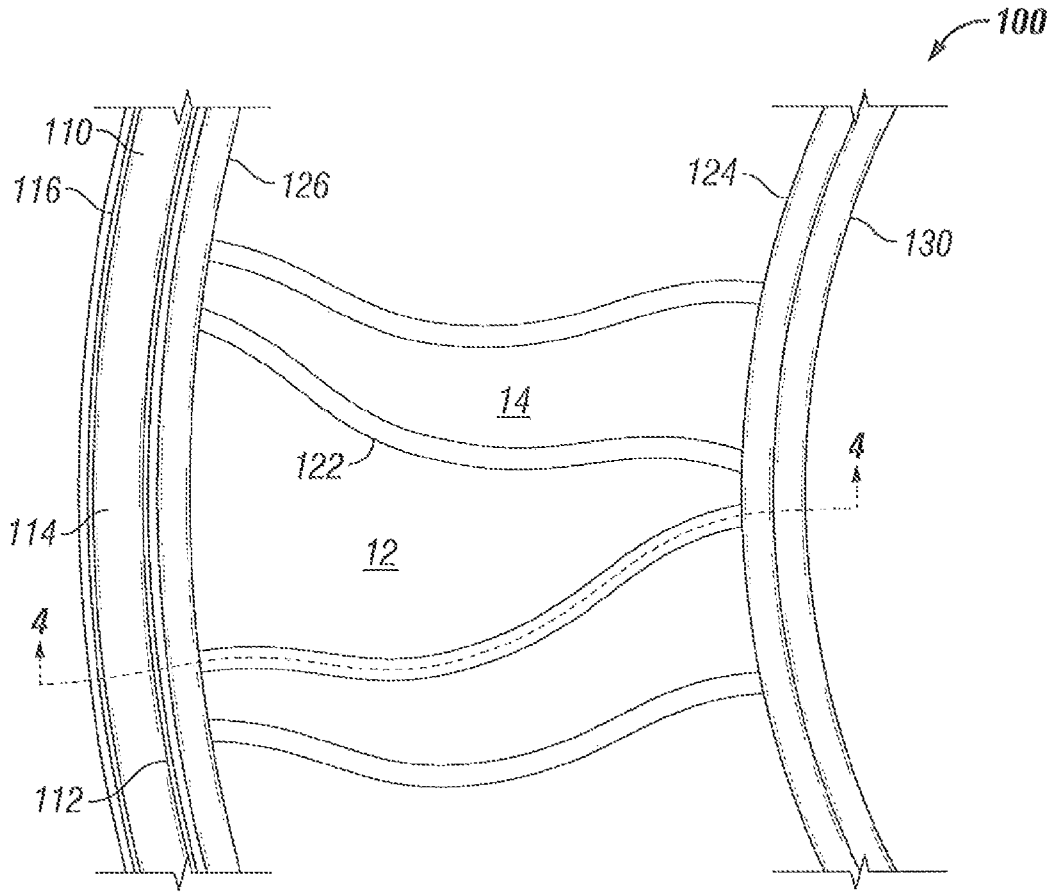
FIG. 3 is a detail view looking axially downward of the non-pneumatic deformable structure 200 showing the shape of the molded spoke at its attachment to the annular band.
Figure 4:
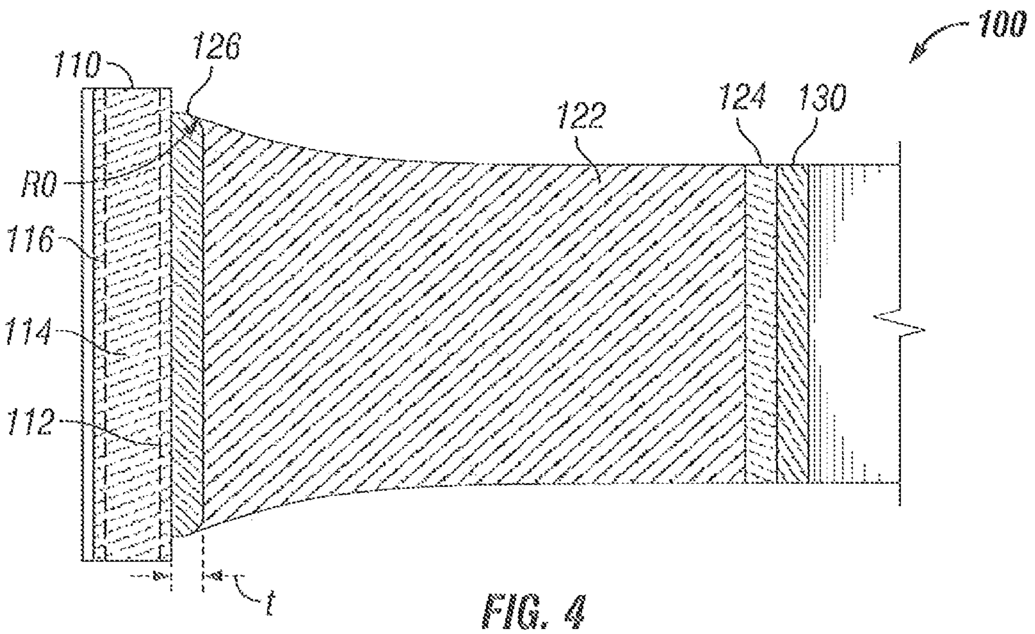
FIG. 4 is a detail view of a non-pneumatic deformable structure 100 looking in the circumferential direction showing the cross-section A-A as indicated in FIG. 3 and following the path of a spoke 122.

FIG. 1 depicts a non-pneumatic deformable structure 100 of the type disclosed in U.S. Pat. No. 7,201,194 in rolling contact under a vertical force $F_2$ which produces a vertical deflection Δ. As shown in FIG. 1, FIG. 3, and FIG. 4, the non-pneumatic deformable structure 100 comprises an outer annular band 110, which may include a tire-like tread portion (not shown) for contacting the ground, and inner hub 130 for attaching the structure 100 to a rotating means such as a vehicle axle, and a plurality of web spokes 120 and 122 which connect the band 110 to the hub 130. The spokes 120 or 122 are not directly molded against the band 110 and the hub 130. Instead, the radially inner ends of the spokes terminate in an inner interface element 124, and the radially outer ends of the spokes terminate in an outer interface element 126. That is to say, the inner cavity of mold 10 is designed so that the spokes 120 or 122 and the interface elements 124 and 126 are molded as a monolithic structure. For the exemplary embodiment shown in FIG. 4, the interface elements 124 and 126 form essentially annular rings that are molded as the spokes are molded to form a molded article. In the exemplary embodiment disclosed herein, the molded article is manufacture in situ by molding against the annular band 110 and the hub 130, thereby providing a secure attachment of the molded article to the outer annular band 110 and the hub 130. However it is equally possible to manufacture the molded article as a separate piece and thereafter attach this to the annular band 110 and the hub 130 by any suitable means. As non-limiting examples, the molded article could be attached by adhesive bonding, by mechanical fixation, by an interference fit between the band 110 and the hub 130. The band 110 may further comprise a reinforcement structure as shown in FIG. 3 and FIG. 4, which depict a first or inner membrane 112, a shear layer 114, and a second or outer membrane 116. The term membrane as used herein refers to an annular element having a significantly higher tensile modulus in the circumferential direction than shear modulus of the shear layer 114. Exemplary embodiments of the membranes 112 and 116 may contain a reinforced layer using textile or metallic cords or a homogeneous material having a modulus significantly higher than the shear layer 114. FIG. 4 depicts cord reinforcing elements oriented in the circumferential direction. A more detailed description of such a non-pneumatic deformable structure can be found in U.S. Pat. No. 7,201,194, which is incorporated by reference in its entirety.

The tensile and bending rigidity of the outer annular band 110 provide a load carrying path to the hub 130 by tensile forces in the spokes 120. As can be appreciated in FIG. 1, the spokes within the area in contact with the ground are designed to buckle when submitted to a compressive load. Thus, the structure 100 supports the applied load by tensile forces in the spokes which are outside the contact area. As the structure rolls, both the band 110 and the spokes 120 are subjected to large deformations of the type described in United States Patent Publication No. 2009/0294000A1, which is incorporated by reference in its entirety. It will be readily appreciated by one skilled in the art that any molding anomaly, like that caused by a small air bubble, will produce a stress concentration that may impact fatigue durability.

Figure 5:
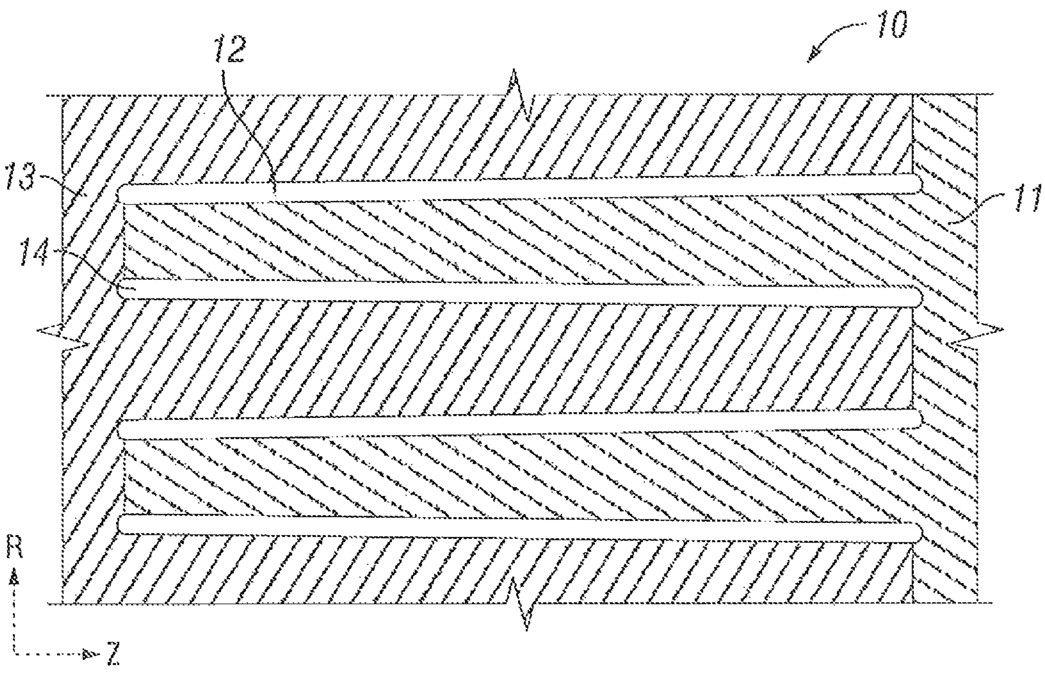
FIG. 5 is a schematic view of a rotating mold 10 for the manufacture of a non-pneumatic deformable structure.

A better understanding of the problem of the location of the bubbles can be had by reference to FIG. 4 and FIG. 5. FIG. 5 depicts a schematic view of a rotating mold 10 used to manufacture the non-pneumatic deformable structure 100. The mold 10 comprises a an upper mold part (to the right side of FIG. 5) containing a first set of axially oriented cores or fingers 11 projecting downward from the top of the mold and terminating axially in contact with the lower mold part. During the manufacturing process, the mold rotates about an axis that is common to the axis of rotation for the molded article. The first set of cores forms a first set of voids 12 between pairs of spokes 120 or 122. The mold 10 has a lower part (to the left side of FIG. 5) containing a second set axially oriented cores or fingers 13 projecting upward from the bottom of the lower mold part and terminating axially in contact with the upper mold part. The second set of cores forms a second set of voids 14 between the remaining sets of spokes 120 or 122. In the example described herein, the cores alternate between the upper mold part and the lower mold part. The radially inner ends of the cores terminate at a radius greater than the outer radius of the hub 130 to provide a mold cavity for forming the inner interface element 124. Likewise, the radially outer ends of the cores terminate at a radius less than the inner radius of the annular band 110 to provide a mold cavity for forming the outer interface element 126.

During the manufacturing of the non-pneumatic deformable structure 100, the outer annular band 110 and the hub 130 are first positioned in the mold concentric with the mold axis to form the radially outer and inner mold surfaces. Next, the upper mold part and lower mold part close and form the casting cavity for the interface elements 124 and 126 and the spokes 120 or 122. The molding process uses a rotating mold 10 for what is known in the art as centrifugal casting. The casting material is a two-part polyurethane that is premixed and then poured into the mold from the top and near the axis of rotation. For the example described herein, the polyurethane is a commercially available product sold under the trade name Vibrathane® B836 manufactured by Chemtura Corporation.

Figure 6:
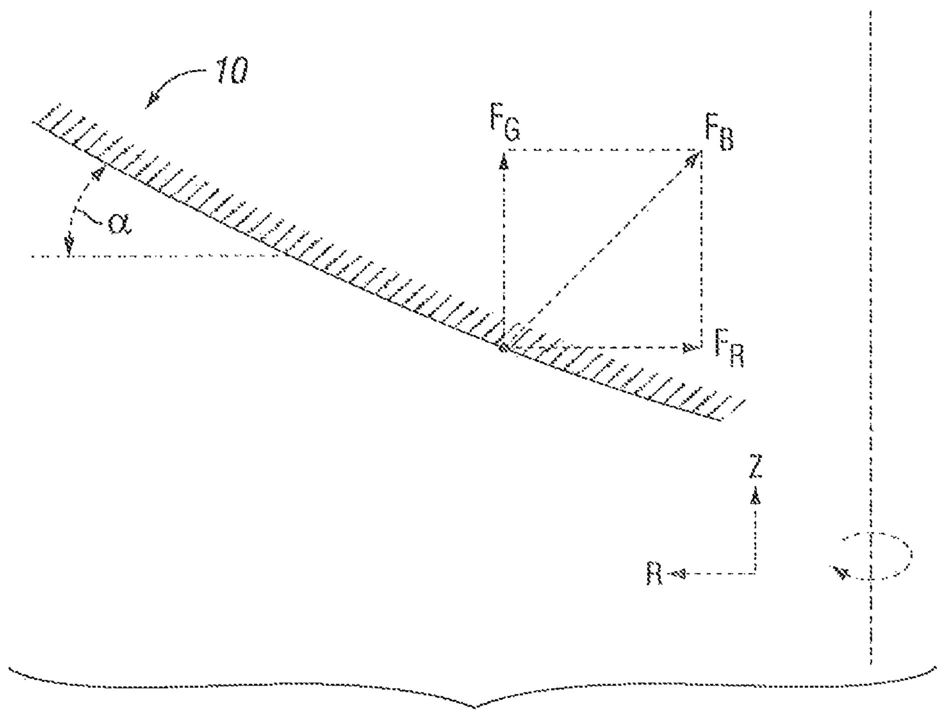
FIG. 6 schematic representation of forces acting on an entrained air bubble

Any air bubbles that may be entrained in the uncured polyurethane mix will be subjected to a buoyancy force which has a vertical component due to gravity and a radial component due to centripetal acceleration, the latter arising from the rotation of the mold. FIG. 6 depicts a schematic representation of a small air bubble 50 (shown by the cross-hatching) in contact with an upper surface of the mold 10. In this example the mold surface has a slope defined by the angle α with respect to the horizontal. The buoyancy force FB on the bubble is a vector sum of the gravity component FG and the centripetal or rotational component FR. That is to say:

$$\vec{FB}=\vec{FG}+\vec{FR}\ \vec{FG}=\rho g V\ \vec{FR}=\rho\omega^2 RV$$

where,

ρ=density of the casting material g=gravitational constant

ω=angular velocity of the mold rotation

V=volume of the bubble

For a non-rotating mold, or gravity casting, the rotational component FR is zero and the buoyancy force vector FB is vertically upward. An entrained bubble will move up the slope of the mold and tend to rise to the highest point in the mold. However, when the mold rotates, the rotational component FR is directed radially inward, and the resultant buoyancy vector FB is rotates inward as well. If the rotation of the mold increases sufficiently, the resultant vector FB will move to an angle that is normal to the mold surface. Under this condition, the bubble is in equilibrium and will tend to remain at its radial and vertical location. When the rotation of the mold is further increased, the resultant vector FB is directed inward of the normal to the mold, and the bubble will tend to be driven inward along the slope of the mold surface. This condition may be advantageous to urge the bubble to move to a location where there is sufficient mold venting to expel the bubble from the molding material.

Figure 7:
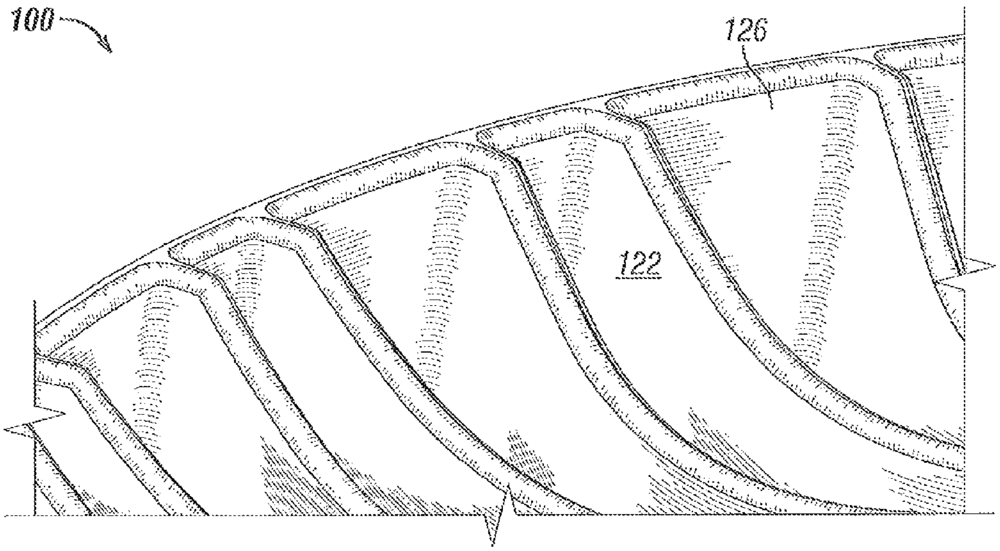
FIG. 7 is an isometric view a non-pneumatic deformable structure 100 showing the areas where air bubbles may become trapped.
Figure 10A:
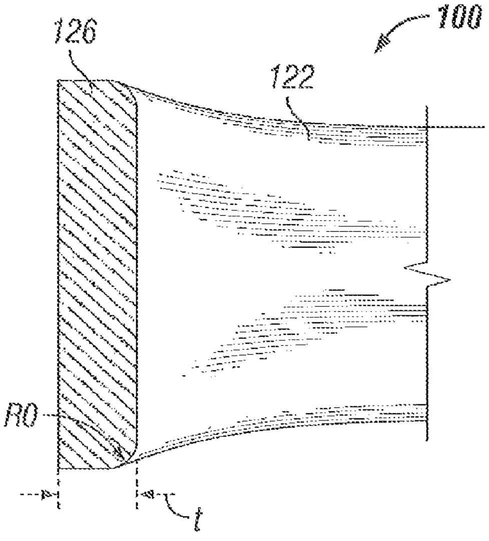
FIG. 10*a* is a schematic cross section of the outer interface element of the non-pneumatic deformable structure 100 depicting the constant edge radius.

Turning now to FIG. 4 and to FIG. 7. The outer interface element 126 appears in FIG. 4 in cross section view and is defined by a thickness t, an axial width w. The radially outer surface of the outer interface element 126 is cast against the radially inner surface of the annular band 110. In the voids between pairs of spokes, the outer interface element 126 has a convex edge radius R0 at each of the axial ends. The edge radius R0 is more readily seen in FIG. 7 and in FIG. 10*a* and is formed between the radially inner surface of the outer interface element 126 and the essentially flat surface forming the axial ends of the interface element. The edge radius R0 shown in FIG. 10*a* is tangent to the axial edge of the outer interface element 126 and the cylindrical portion of the interface element. This implies a practically limit for the maximum edge radius R0 not to exceed the thickness t of the outer interface element 126. One can appreciate that the interior surface of the mold 10 will correspondingly have a concave edge radius equal in magnitude to R0. The outer interface element 126 is formed from the section of the mold 10 where the cores project from the upper mold part towards the bottom of the mold. The cylindrical portion of the mold between the spokes does not possess a venting path. Therefore, during the molding operation and depending on the angular velocity of mold rotation w, a bubble will tend towards an equilibrium position where the tangent to the edge radius of the mold is perpendicular to the resultant buoyancy vector FB. The equilibrium position of the bubble is shown schematically in FIG. 10*a*. The equilibrium angle α is given by the equation:

$$\alpha = \tan^{-1}(FR/FG) = \tan^{-1}\left(\frac{\omega^2 R}{g}\right)$$

The equilibrium angle α is about 45 degrees for an exemplary geometry where the molded article has a maximum radius of 300 mm and the mold is rotating at about 55 rpm.

Figure 8:
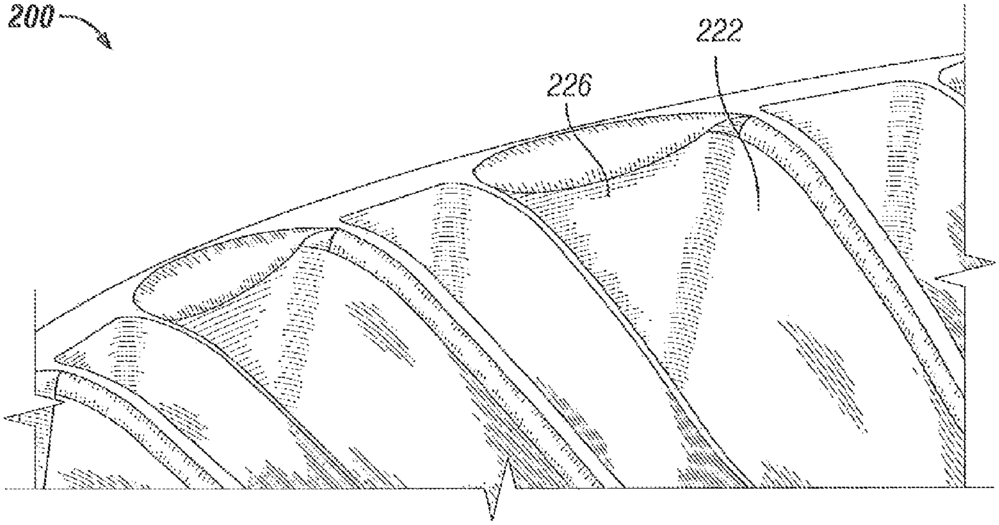
FIG. 8 is an isometric view a non-pneumatic deformable structure 200 showing an improved shape to reduce the tendency to trap air bubbles.

The problem of entrained air bubbles can be alleviated if this equilibrium is disrupted in a manner to drive the bubbles to a portion of the mold where venting can occur. One such geometry is shown for the non-pneumatic structure 200 in FIG. 8 and FIG. 9. Throughout the discussion, elements that are similar between the non-pneumatic structure 200 and the reference non-pneumatic deformable structure 100 will use correspondingly similar notation. The edge radius of the non-pneumatic structure 200 is no longer constant between spokes, but has a variable edge radius along the edge of the cylindrical portion of the interface element and for the corresponding mold geometry. The edge radius has its maximum value R1 in the portion of the interface element that is situated circumferentially about mid way between each of the adjacent spokes. The edge radius continuously decreases circumferentially from the mid point of the interface element towards the intersection of the interface element with the spoke 222 to reach a minimum radius R3.

The edge radii shown in FIG. 10 are tangent to the axial edge of the outer interface element 226 and the cylindrical portion of the interface element. This implies a practically limit for the maximum edge radius R1 not to exceed the thickness t of the outer interface element 226. For the exemplary embodiment shown in FIG. 9, the maximum edge radius is between about eighty percent and ninety five percent of the radial thickness t of said outer interface element 226. If a larger maximum edge radius R1 is needed, then this may be achieved by ignoring the tangent condition at the axial edge of the outer interface element 226. The minimum edge radius R3 occurs at the intersection of the outer interface element 226 and the spoke 222. At this location, the ability to vent the mold is improved when the minimum edge radius R3 is as small as possible or nearly zero. The progression of the variation of the edge radii from R1 to R3 is not critical as long as the progression is continuously decreasing.

Figure 9:
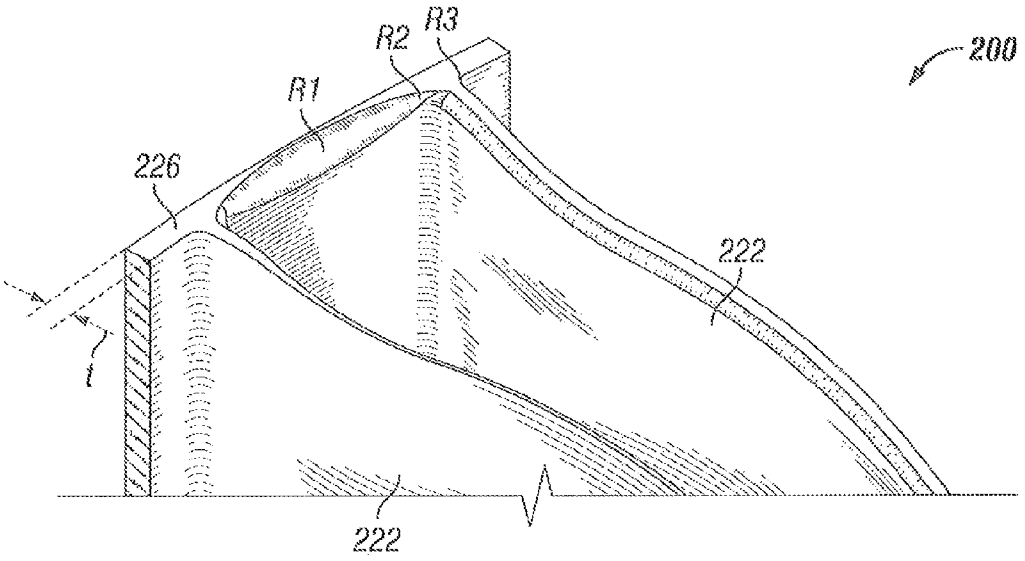
FIG. 9 is an isometric view a non-pneumatic deformable structure 200 showing the variation of the edge radius along the periphery of the annular band.

A simplified example geometry is to control the progression of the edge radii with three "control" radii, R1, R2 and R3, where the progression of the edge radii is described by a smooth progression through the locations and magnitudes of the three control radii. For the exemplary embodiment of non-pneumatic structure 200, shown in FIG. 9, R1 is chosen to be as large as possible relative to the thickness t of the cylindrical region of the mold cavity. FIG. 9 provides an example where the thickness t is about 3.2 mm and the first control radius R1 is about 2.8 mm near the center of the feature. The second control radius R2 has an angular location near the intersection of the outer interface element 226 and the spoke 222. The second control radius R2 as a value of about 0.75 mm, but may vary between about fifteen percent and thirty percent of the radial thickness t of said outer interface element 226. The third control radius R3 is positioned at the intersection of the outer interface element 226 and the spoke 222. The third control radius R3 very small or effectively zero or commonly less than five percent of the thickness t. It will be appreciated that the mold 10 will have concave edge radii equal to the control radii R1, R2, and R3.

Figure 10B:
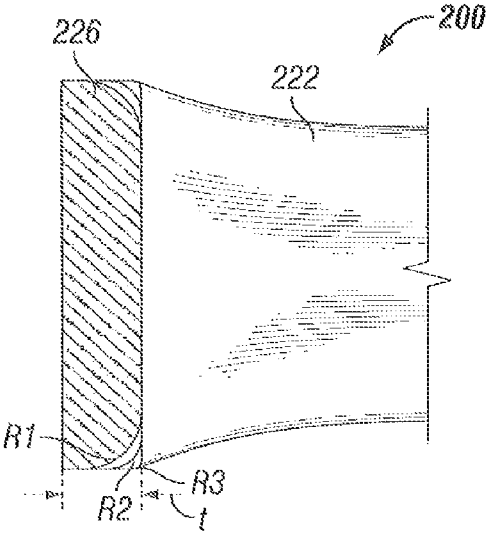
FIG. 10*b* is a schematic cross section of the outer interface element of the non-pneumatic deformable structure 200 depicting the variable edge radii.

The advantage of the variable edge radius is that it urges the air bubbles to a location where venting can occur. For the exemplary embodiment of non-pneumatic structure 200, the bubbles can vent in the area near the third control radius R3. The function of the variable edge radius can be better appreciated by reference to FIG. 10*b*, which provides and comparison of the cross sections of outer interface element 226 at the angular positions corresponding to R1, R2, and R3, respectively. For this illustrative example, a bubble is shown at a location on R1 and about 45 degrees relative to the axis of rotation. It can be seen that the buoyancy force vector FB will tend to drive the bubble "uphill" in a direction perpendicular to the plane of FIG. 10*b*. In this sense, the bubble is urged to move to a circumferential location towards the control radius R2, and then ultimately towards the control radius R3 where venting can occur. This is illustrated in FIG. 10*b* by a dotted line depicting the geometric slope form R1 towards R3. It is apparent that the dotted line of FIG. 10*b* aligns in the same general directions as the buoyancy force vector FB shown in FIG. 6. By comparison to the reference non-pneumatic deformable structure 100 shown in FIG. 10*a*, the outer interface element 126 having a constant edge radius lacks the "uphill" profile of the outer interface element 226. Therefore, the buoyancy force FB will not act to move the bubble in the circumferential direction.

Returning to FIG. 8 and FIG. 9, it can be seen that the outer interface element 226 has the variable edge radius on every other pair of spokes. In the mold 20 used to manufacture the non-pneumatic structure 200, the variable edge radius is applied to the first set of cores which project downward from the upper mold part to form a first set of voids 22 on the molded product. However, the second set of fingers projecting from the lower mold part, which form a second set of voids 24, mate with the upper mold part in a manner that allows venting to occur along the top edge of the outer interface element 226. Thus, the variable edge radius is not essential for the edges of the void 24. For the exemplary embodiment shown in FIG. 8, the edge radius is very small or effectively zero, and less than five percent of the thickness t.

While this invention has been described with reference to particular embodiments and examples thereof, it shall be understood that such description is by way of illustration and not by way of limitation. Accordingly, the scope and content of the invention are to be defined only by the terms of the appended claims.

The invention claimed is:

1. A molded article comprising an outer interface element having a circumference and an axial width, an inner interface element having a circumference and an axial width, a plurality of web spokes positioned therebetween, and said web spokes being oriented in a generally radial direction, and the common surfaces of said inner interface element, said outer interface element, and a pair of adjacent web spokes forming a void space, wherein a surface of at least a portion of an axial end of said outer interface element common to said void space has an edge radius and said edge radius has a variation from a maximum edge radius value at a circumferential location corresponding to a midpoint between a pair of adjacent web spokes to a minimum edge radius value at the circumferential location corresponding to the intersection of said outer interface element with at least one of said web spokes whereas said edge radius is formed between the radially inner surface of said outer interface element and said axial end surface.

2. The molded article according to claim 1, wherein the variation of said edge radius is defined by a set of decreasing radii at circumferential locations between said midpoint between a pair of adjacent web spokes and at least one of said web spokes.

3. The molded article according to claim 1, wherein said minimum edge radius value is less than about five percent of a radial thickness of said outer interface element.

4. The molded article according to claim 1, wherein said maximum edge radius value is between about eighty percent and ninety five percent of a radial thickness of said outer interface element.

5. The molded article according to claim 1, wherein the variation of said edge radius is defined by a plurality control radii.

6. The molded article according to claim 5, comprising a first control radius at a circumferential location corresponding to said midpoint between a pair of adjacent web spokes, second control radius at a circumferential location circumferentially adjacent to a surface of said web spokes, and a third control radius at a circumferential location corresponding to the intersection of said outer interface element with one of said web spokes.

7. The molded article according to claim 6, wherein said first control radius is between about eighty percent and ninety five percent of a radial thickness of said outer interface element.

8. The molded article according to claim 6, wherein said second control radius is between about fifteen percent and thirty percent of a radial thickness of said outer interface element.

9. The molded article according to claim 6, wherein said minimum edge radius value is less than about five percent of a radial thickness of said outer interface element.

10. The molded article according to claim 1, wherein the edge radius of the portion of said outer interface element corresponding to a first void is variable, and the edge radius of the portion of said outer interface element corresponding to a second void is constant.

11. The molded article according to claim 1, wherein a first void and a second void are circumferentially adjacent.

* * * * *